United States Patent [19]

Svensson

[11] Patent Number: 4,825,979
[45] Date of Patent: May 2, 1989

[54] BRAKE ADJUSTER

[76] Inventor: Sten-Eric Svensson, Päronvägen 26, S-262 00 Ängelholm, Sweden

[21] Appl. No.: 883,029

[22] Filed: Jul. 10, 1986

Related U.S. Application Data

[63] Continuation of Ser. No. 601,625, Apr. 13, 1984, abandoned.

[30] Foreign Application Priority Data

Sep. 30, 1982 [SE] Sweden .............................. 82055724
Sep. 13, 1983 [WO] PCT Int'l Appl. .... PCT/SE83/00322

[51] Int. Cl.⁴ ............................................. F16D 65/52
[52] U.S. Cl. ............................... 188/79.55; 188/79.51; 188/79.56; 188/196 D
[58] Field of Search ............... 188/79.5 GE, 79.5 K, 188/79.5 P, 196 R, 196 D, 196 V, 79.51, 79.55, 79.54, 79.53, 79.57, 79.58, 79.59, 79.62

[56] References Cited

U.S. PATENT DOCUMENTS

| | | | |
|---|---|---|---|
| 1,875,065 | 8/1932 | Lyman | 188/79.5 K |
| 3,342,293 | 9/1967 | Hildebrand et al. | 188/79.5 K X |
| 3,428,154 | 2/1969 | Lodjic et al. | 188/79.5 K X |
| 3,809,189 | 5/1974 | Farr | 188/196 D X |
| 3,921,765 | 11/1975 | Swander, Jr. | 188/79.5 K |
| 4,121,703 | 10/1978 | Moss | 188/79.5 K X |
| 4,384,638 | 5/1983 | Crissy et al. | 188/79.5 K |
| 4,440,268 | 4/1984 | Karlsson | 188/79.5 K |
| 4,484,665 | 11/1984 | Svensson | 188/79.5 K |

FOREIGN PATENT DOCUMENTS

| | | |
|---|---|---|
| 1902798 | 8/1970 | Fed. Rep. of Germany ... 188/79.5 K |
| 7910263-8 | 9/1981 | Sweden . |
| 82/01922 | 6/1982 | World Int. Prop. O. ...... 188/196 R |

Primary Examiner—Andres Kashnikow
Assistant Examiner—Matthew C. Graham
Attorney, Agent, or Firm—Shapiro and Shapiro

[57] ABSTRACT

A brake adjuster for the automatic adjustment of vehicle brakes during the brake application stroke has a lever (13) which is connected to a brake cylinder (2) via a piston rod (1) and, via a slack adjuster (15), is connected to a cam shaft (4) with a brake key (5) for brake application. The slack adjuster (15) cooperates via a one-way clutch (20), a torque limiter (43) and a motion transmitter (28) with a control disc (39) which is fixedly connected to a bearing housing (9) for the cam shaft (4).

4 Claims, 3 Drawing Sheets

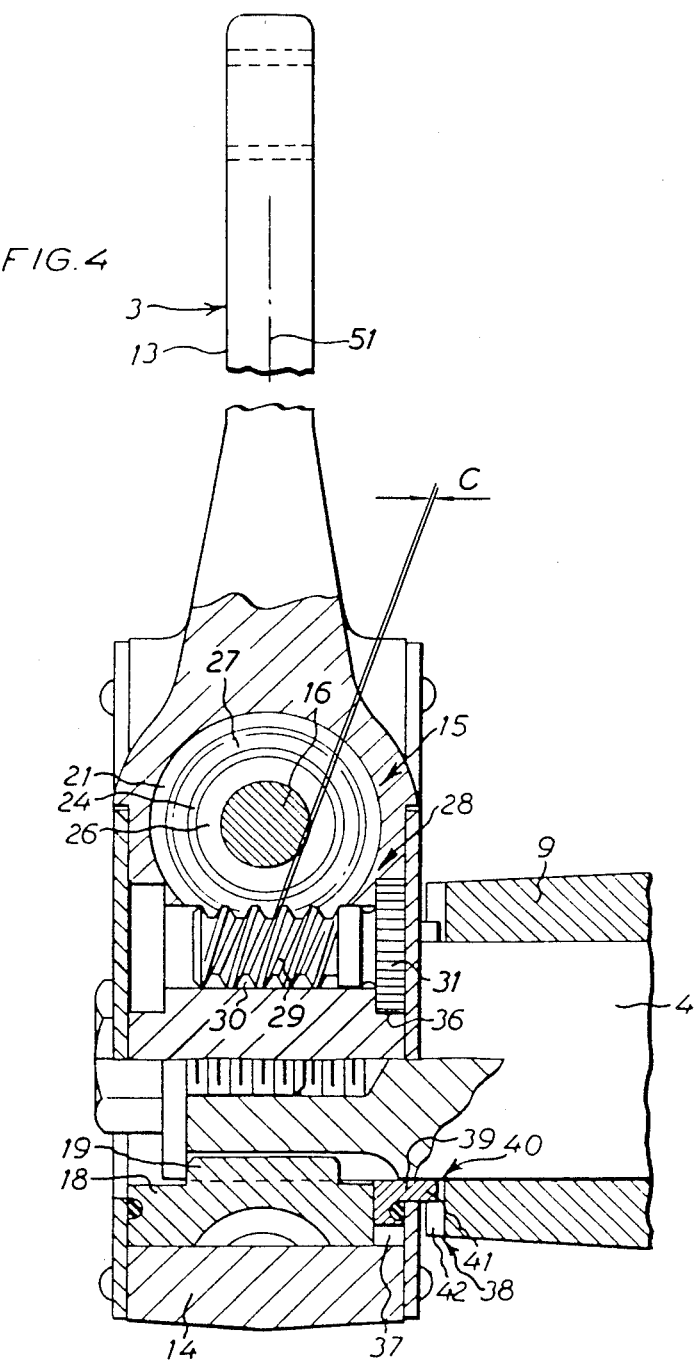

BRAKE ADJUSTER

This is a continuation of application Ser. No. 601,625 filed Apr. 13, 1984, now abandoned.

This invention relates to an adjuster for the automatic adjustment of vehicle brakes, said adjuster having a lever connected to an actuator and, via slack adjusting means, to drive means for brake application, said slack adjusting means cooperating, via a one-way clutch and motion transmitting means, with control means fixedly connected to a stationary part of the vehicle.

The adjuster is of the brake adjuster type which is slow-acting and effects adjustment only upon excessive clearance between the brake lining and the brake drum. The adjuster is based upon the clearance sensing principle, which means that the adjuster mechanism is to sense the clearance and not the piston stroke of the actuator which is in the form of a brake cylinder. Thus, the adjuster is not intended to compensate for that part of the piston stroke which represents the elasticity in the brake system.

A further feature of the adjuster according to the invention is that it is sufficiently quick-acting to be able to compensate for brake lining wear, but still is sufficiently slow-acting so as not to compensate for thermal expansion of the brake drum.

The object of the present invention is to provide an adjuster of the above-mentioned construction which, in contrast to prior art adjusters of the same type, effects adjustment during the brake application stroke instead of the return stroke. It is true that the return stroke is smoother and more readily controlled, which is an advantage, but on the other hand it is not unusual that the return springs of the brake are inadequate to be able to release the brake and at the same time to effect adjustment. Besides, an adjuster which effects adjustment during the return stroke is highly sensitive to deformation of the tooth profile of the main gear included therein.

According to the invention, this object is achieved in that a torque limiter is mounted between the one-way clutch and the slack adjusting means and comprises two clutch rings one of which is rotatable with respect to the slack adjusting means and the other is fixedly mounted thereon, said rings having friction surfaces facing each other and constantly engaging each other.

The invention will be described in greater detail hereinbelow with reference to the accompanying drawings showing a preferred embodiment.

FIG. 4 is a section taken along the line IV—IV in FIG. 3.

Figure 1:
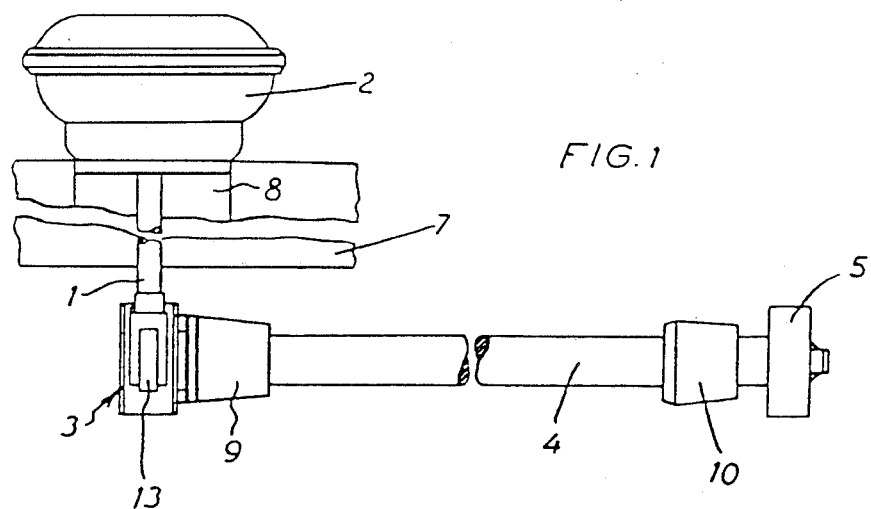
FIG. 1 shows schematically from above the basic construction of a brake operating mechanism comprising the adjuster according to the invention.
Figure 2:
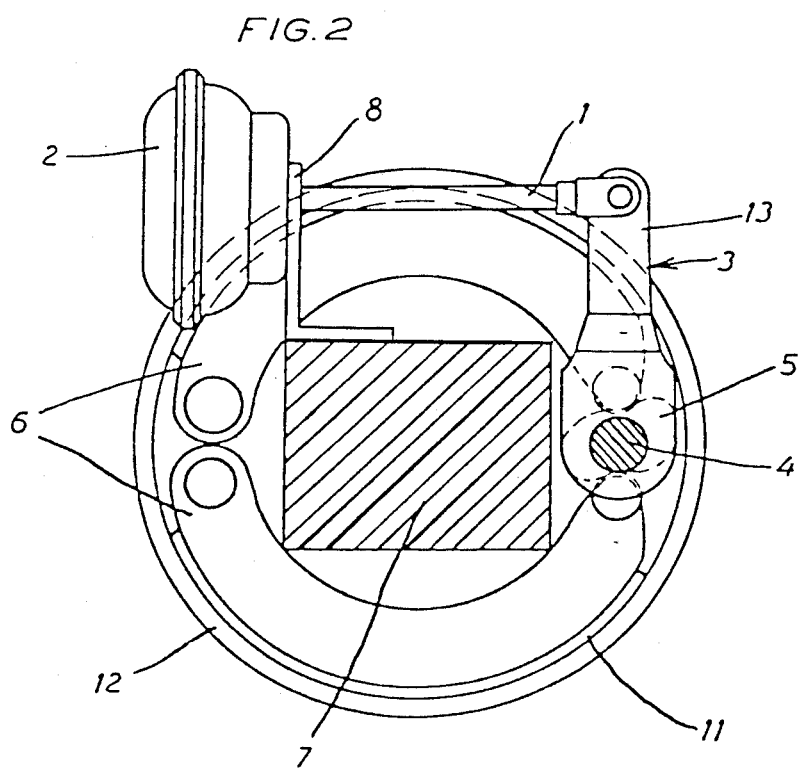
FIG. 2 shows the mechanism according to FIG. 1 from the side, more precisely from the left-hand side.

The brake operating mechanism as shown in FIGS. 1 and 2 comprises a piston rod 1 of an actuator in the form of a conventional brake cylinder 2, a brake adjuster 3 between the piston rod 1 and one end of a cam shaft 4, the other end of which carries a brake key or S-cam 5 which is positioned between two conventional brake shoes 6. The brake cylinder 2 may be mounted on he vehicle in several different ways, but in the embodiment illustrated it is mounted on an axle casing 7 via a bracket 8. Adjacent the brake adjuster 3, the cam shaft 4 is mounted in a bearing housing 9 which, in turn, is fixedly mounted on the vehicle. At its other end, the cam shaft 4 is mounted in a bearing housing 10 secured to a brake anchor plate or the like (not shown). The movement of the piston rod 1 upon brake application, i.e. upon dactivation of the brake cylinder 2, causes the brake adjuster 3 to rotate together with the cam shaft 4 so that the S-cam 5 is rotated and thus urges the brake linings 11 of the brake shoes 6 into braking frictional engagement with the inside of the brake drum 12.

Figure 3:
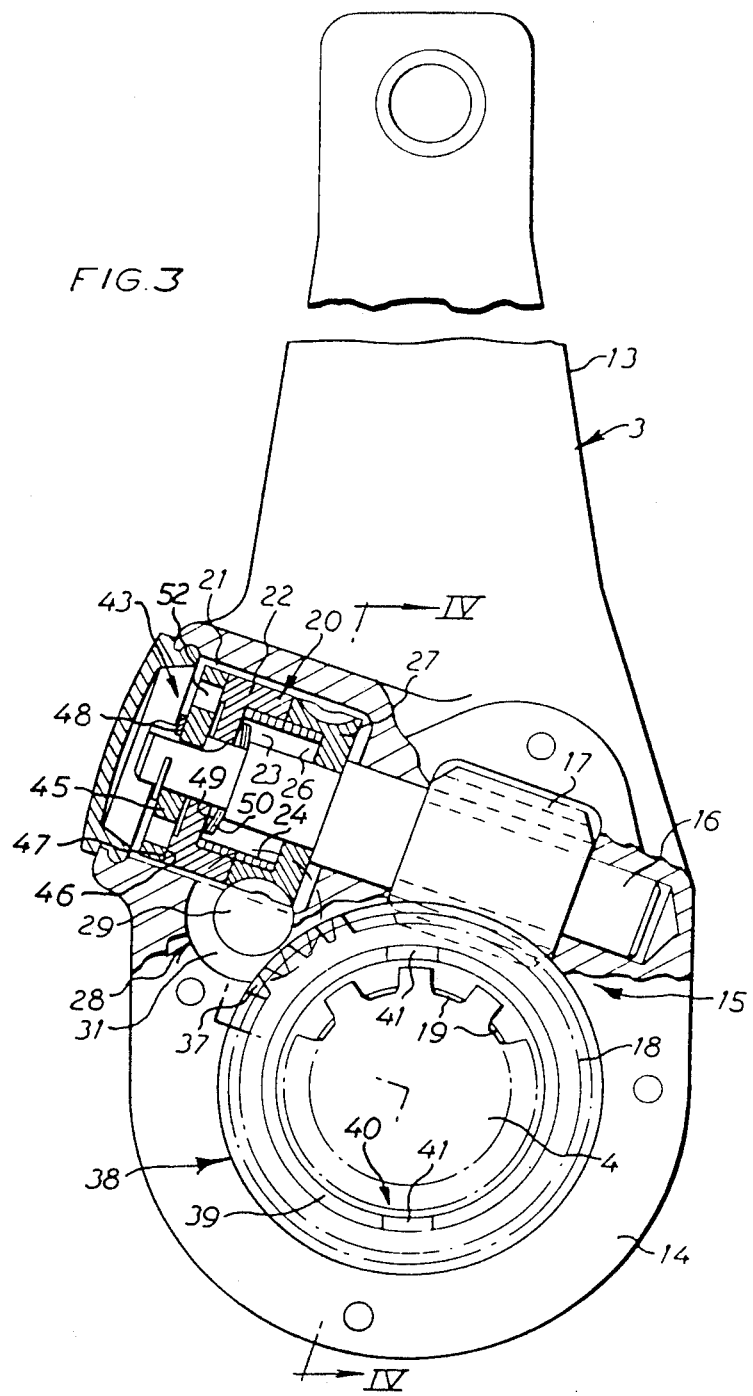
FIG. 3 is a side view of the adjuster according to the invention, with a portion broken away to show interior details.

The brake adjuster 3 shown in FIGS. 3 and 4 has a lever 13 pivotally connected at one end to the piston rod 1 of the brake cylinder 2, the other end of said lever being formed as a housing 14 for accommodating components.

Among these components is a slack adjusting means 15 which comprises a worm screw 17 non-rotatably mounted on or formed integrally with a worm shaft 16 mounted in the housing 14, said worm screw 17 engaging a worm wheel 18 which is also mounted in the housing 14 and has internal splines 19 engaging external splines (not shown) on the cam shaft 4.

At its end opposite the worm screw 17, the worm shaft 16 of the slack adjusting means 15 is connected to a one-way clutch 20 disposed in a recess 21 in the housing 14. The one-way clutch 20 comprises a clutch ring 22 having a stepped bore 23 within which a portion, in the embodiment illustrated about half, of a retaining spring 24 is disposed. The remainder of the retaining spring 24 is disposed in a stepped bore 26 in a worm wheel 27 which forms part of a motion transmitting means 28 whose worm wheel 27 engages a worm 29 which is mounted on a bore 30 in the housing 14. The worm 29 is fixedly connected to or made integral with a drive member 31 in the form of a pinion.

The pinion 31 is provided with external teeth 36 meshing with external teeth 37 on a control means 38 in the form of an essentially planar disc 39. The disc is fixedly connected to the bearing housing 9 by engagement means 40 permitting the disc to be located in any angular position relative to the bearing housing. In the illustrated embodiment, the engagement means 40 are in the form of projecting lugs 41 on the disc 39, which engage corresponding recesses 42 in the bearing housing 9.

The one-way clutch 20 is connected to the slack adjusting means 15 via a torque limiter 43 which in the embodiment here illustrated and described is made up of the clutch ring 22, in common with the one-way clutch 20, and an additional clutch ring 45 which is affixed to worm shaft 16. The clutch rings 22, 45 have respective friction surfaces 46, 47 facing each other in permanent frictional engagement. The additional clutch ring 45 is nonrotatably mounted on the worm shaft 16 and is axially fixed thereon by means of a locking washer 48. The clutch rings 22, 45 are retained in the above-mentioned frictional engagement with each other by means of a compression spring 49, here in the form of a Belleville spring washer which is disposed between an abutment 50 on the worm shaft 16 and that side of the clutch ring 22 which faces away from its friction surface 46.

As appears from FIG. 4, the adjuster 3 is symmetrical about a longitudinal centre axis 51 so that the brake adjuster, during the assembly thereof, can be adapted in a simple manner for mounting on the left-hand or right-hand side of the vehicle, such that the control disc 39 will always be facing the adjacent bearing housing 9 of the cam shaft 4. The right-hand design of the brake adjuster thus is the mirror image of the left-hand design. The only thing one has to do is to turn the control disc 39 and the worm wheel 18 through 180° and let them change places, while the worm 29 is inserted from the other side. Although the constructional details have been turned around and changed places, all movements will be in the correct direction, the brake adjuster 3 will retain its symmetry, and the function will be identical.

The brake adjuster 3 as described above and illustrated in the drawings operates as follows.

Upon a brake application, the brake adjuster 3 rotates under the action of the piston rod 1 of the brake cylinder 2 together with the cam shaft 4 about the cam shaft centre. The control disc 39, because it is provided with lugs 41 extending into corresponding recesses 42 in the adjacent bearing housing 9 of the cam shaft 4, does not participate in the rotational movement. The relative movement which occurs between the control disc 39 and the lever 13 forces the worm 29, via the pinion 31, to rotate. Since there is a certain predetermined backlash C built in, see FIG. 4, the movement of the worm 29 will not be transmitted to the worm wheel 27 until this backlash has been passed. The backlash C is dimensioned to give the desired clearance between the brake linings 11 and the brake drum 12. As soon as the worm 29 has passed said backlash and starts rotating the worm wheel 27, the brake linings 11 should thus enter into engagement with the brake drum 12. However, if the clearance between the drum and the linings is too great, the adjuster 3 will continue its rotary movement, whereby the movement of the worm 29 will be transmitted to the worm wheel 27 which, via the retaining spring 24, rotates the clutch ring 22. From there the rotational movement is transmitted via the torque limiter 43 to the worm shaft 16 and the worm screw 17. The worm screw 17, in turn, rotates the worm wheel 18 and thus the cam shaft 4 and the S-cam 5, whereupon slack adjustment occurs (reduction of the clearance between the brake linings 11 and brake drum 12). The slack adjustment continues until the linings 11 engage the brake drum 12, when the torque in the brake adjuster suddenly increases. The slack adjustment ceases when the torque has reached a certain value, but as a result of the elasticity in the power transmitting parts of the brake, the brake adjuster 3 will continue its rotation. Since no slack adjustment can occur but the rotation still proceeds, the torque limiter 43 is now forced to slip. It will slip until the desired pressure in the brake cylinder 2 has been attained and the brake adjuster 3 has interrupted its movement.

Upon release of the brake, there is a change of the direction of rotation of the worm 29 which initially does not affect the worm wheel 27 because the backlash C should first be passed, but which will thereafter rotate this wheel until the brake has assumed its released position. The movement is transmitted only as far as the worm wheel 27 since the retaining spring 24 in the one-way clutch 20 slips in this direction.

The excessive clearance has now been slightly reduced during the braking cycle described but, because of the slow action of the brake adjuster, a further number of braking cycles are required before the clearance is reduced to the C value.

Because the brake adjuster operates continuously and the degree of adjustment for each brake application depends upon the amount by which the clearance is too large, the brake adjuster has an asymptotic take-in curve, which means that the clearance asymptotically approaches the predetermined value.

Of course, the brake adjuster may also be operated by hand, for instance after exchange of brake linings 11. For such manual adjustment, the cover 47 is dismantled and a tool (not shown) is brought into engagement with a recess 52 in the clutch ring 45.

Naturally, the invention must not be considered restricted to the embodiment described above and illustrated in the drawings, but may be modified in different ways within the scope of the appended claims.

I claim:

1. An adjuster for the automatic slack adjustment of vehicle brakes during the brake application stroke and constructed to ensure a predetermined minimum brake lining-to-drum clearance, said adjuster (3) having a lever (13) connected to an actuator (2, 1) and, via slack adjusting means (15), to drive means (4, 5) for brake application, said slack adjusting means (15) cooperating, via a one-way clutch (20) and motion transmitting means (28), with control means (38) fixedly connected to a stationary part (9) of the vehicle, said motion transmitting means (28) including a worm wheel (27) connected to said slack adjusting means (15), via said one-way clutch (20), and a worm (29) engaged with said worm wheel (27) and cooperable with the control means (38) through a drive member (31), characterized in that said one-way clutch (20) is connected to said slack adjusting means (15) via a torque limiter (43) which includes two clutch rings (22, 45) having respective friction surfaces (46, 47) facing each other in permanent frictional engagement, with one (22) of said clutch rings being rotatable with respect to the slack adjusting means (15) and the other (45) of said clutch rings being fixedly mounted on the slack adjusting means (15), and characterized further in that said worm (29) and said worm wheel (27) have a predetermined backlash (C) corresponding to said predetermined minimum clearance and through which said worm (29) must pass in order to transmit motion to said worm wheel (27) for effecting slack adjustment, thus ensuring said predetermined minimum clearance.

2. An adjuster as claimed in claim 1, characterized in that said one clutch ring (22) is also part of the one-way clutch (20).

3. An adjuster as claimed in claim 1, characterized in that said friction surfaces (46,47) of the clutch rings (22, 45) are maintained in constant frictional engagement with each other by means of a compression spring (49).

4. An adjuster as claimed in claim 3, characterized in that the compression spring is a Belleville spring washer (49) which is mounted between an abutment (50) on the slack adjusting means (15) and a side of said one clutch ring (22) opposite said friction surface (46) of said one clutch ring (22).

* * * * *